J. J. PFENNINGER.

2 Sheets—Sheet 1.

BAKE OVEN.

No. 11,439.

Reissued Sept. 4, 1894.

Witnesses

J. J. O'Donoghue

J. Vastine

Inventor

J. J. Pfenninger.

By his Attorneys

Keller & Stacer

2 Sheets—Sheet 2
J. J. PFENNINGER.
BAKE OVEN.
No. 11,439. Reissued Sept. 4, 1894.
Fig. 5.
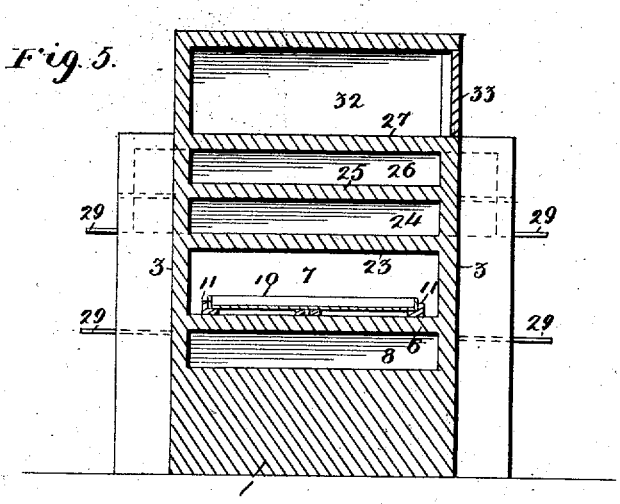
Fig. 7.
Fig. 6.
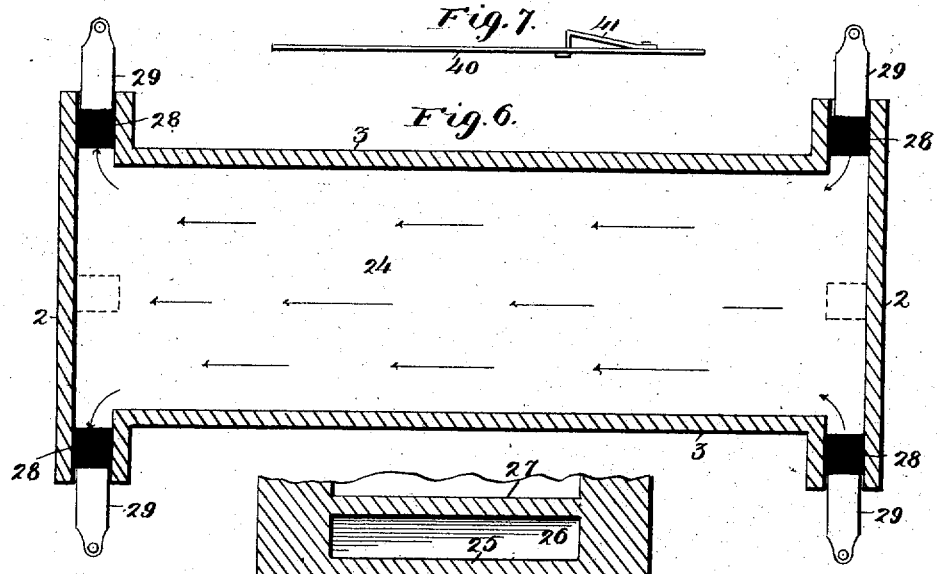
Fig. 8.
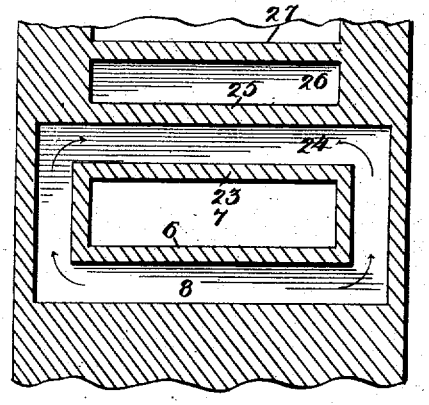
Witnesses
J. J. O'Donohoe
J. P. Vastene
Inventor
J. J. Pfenninger.
By his Attorneys,
Keller & Starck

UNITED STATES PATENT OFFICE.

JOHN JACOB PFENNINGER, OF ST. LOUIS, MISSOURI.

BAKE-OVEN.

SPECIFICATION forming part of Reissued Letters Patent No. 11,439, dated September 4, 1894.

Original No. 473,018, dated April 19, 1892. Application for reissue filed November 28, 1893. Serial No. 492,320.

*To all whom it may concern:*

Be it known that I, JOHN JACOB PFENNINGER, of the city of St. Louis, State of Missouri, have invented certain new and useful Improvements in Bake-Ovens, of which the following is a full, clear, and exact description, reference being had to the accompanying drawings, forming a part hereof.

My invention has relation to improvements in bake ovens and consists in the novel arrangement and combination of parts more fully set forth in the specification and pointed out in the claims.

Figure 1:
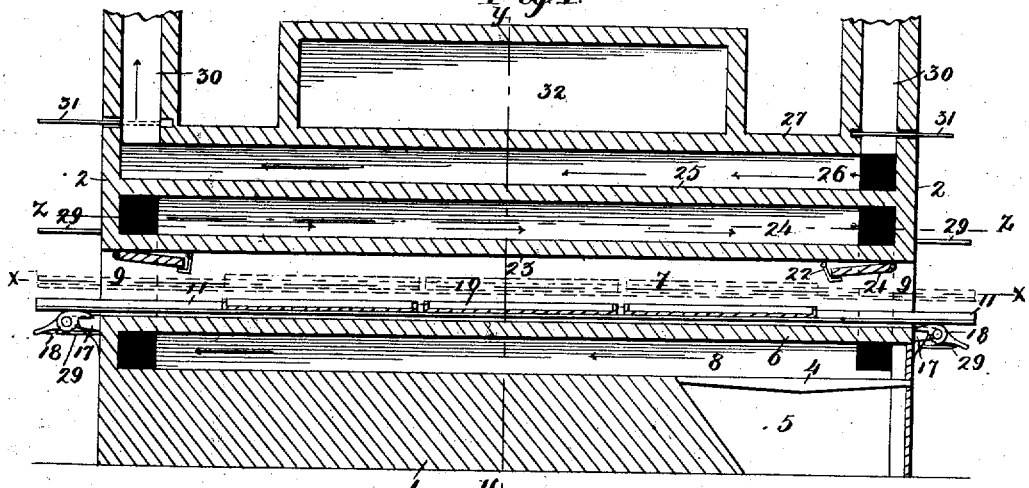
Figure 2:
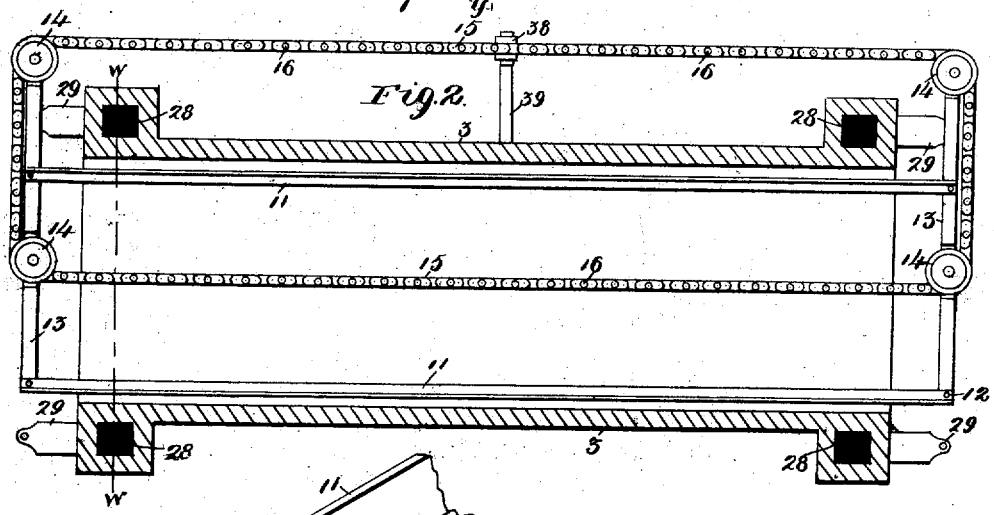
Figure 3:
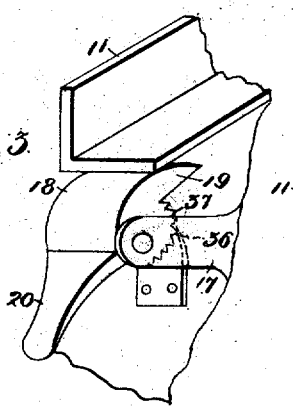
Figure 4:
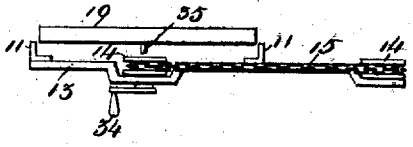

In the drawings, Figure 1 is a vertical longitudinal mid-section of my complete invention. Fig. 2 is a horizontal section taken on the line *x—x* of Fig. 1. Fig. 3 is a perspective view of one of the tracks with parts broken away showing the mechanism for elevating and lowering the same. Fig. 4 is a detail view of the mechanism for operating the endless chain which carries the baking pans. Fig. 5 is a transverse vertical section taken on the line *y—y* of Fig. 1. Fig. 6 is a horizontal longitudinal section taken on the line *z—z* of Fig. 1. Fig. 7 is a detail view of an operating rod for pulling out the bake pans; and Fig. 8 is a vertical transverse section taken on the line *w—w* of Fig. 2.

The object of my invention is to construct an oven especially for baking crackers, biscuits, bretzels, and like articles of food although I may use the same for general baking purposes.

Referring to the drawings, 1 represents the base or foundation of the oven, 2 the end exterior walls of the same, and 3 the side walls. It may be noted in this connection that I may so construct my oven that the same may be portable or stationary.

4 represents a series of grate bars of the fire box, and 5 the ash pit.

Located above the series of grate bars and at a suitable distance from the foundation 1 is the bottom floor 6 of the baking compartment or chamber 7. The floor 8 is composed of fire brick or any other suitable heat-retaining and steam absorbing material and extends across the oven as illustrated in Figs. 1, 5, and 8, but leaving a flue 8 for the passage of the products of combustion from the fire box underneath the floor 6, as best shown in Fig. 1. The baking compartment extends entirely through the oven, and is open at both ends, the walls 2 being provided with openings 9 for the insertion and removal of the bake pans 10.

Resting on the bottom floor 6 are L-shaped tracks 11 on which the bake pans 10 rest and are adapted to slide, by which construction the pans are guided through the oven and the material or dough to be baked is thus guided and suspended above the floor of the baking compartment.

The tracks 11 have secured to the ends thereof by means of bolts or rivets 12 cross-pieces 13, and pivotally mounted on said cross-pieces 13 are chain-wheels 14, and mounted on said chain-wheels is an endless chain 15 which is provided with a series of holes 16. Two of the chain-wheels 14 are located one at each end of the baking chamber 7 and the other two are located alongside thereof at the ends of the outer wall of the baking-chamber, such arrangement permitting one lap of the endless chain 15 to pass through the baking chamber 7 and the other lap to pass outside thereof.

The tracks 11 are elevated and lowered in the following manner: Secured to the end walls 2 in any suitable and mechanical manner are brackets 17 and pivotally mounted on said brackets are levers 18. Said levers are provided with rounded arms 19 which may normally rest against the rails 11 or on the cross bars 13 secured to said rails. The levers 18 secured to each end of the oven as described, may be mounted upon a common shaft and operated simultaneously (which mounting is not illustrated), or they may be operated independently of each other as illustrated. By the operator pressing downwardly on the arms 20 of said levers, the track rails 11 may be elevated simultaneously or independently of each other. This construction is necessary for the following reasons: For instance, if the bake pans 10 are located too near the floor 6 and are becoming too hot for the proper baking of the food it becomes necessary to elevate the pans from the floor and thus decrease the temperature of said pans.

21 indicates doors which are hinged in any suitable and mechanical manner to any suitable and convenient portion of the bake oven and are adapted to swing downwardly and close the openings 9 and thus restrain the heat in the baking chamber 7. Said doors may be elevated and secured in said elevated position by means of hooks 22 as illustrated in Fig. 1, and in fact I always bake with the doors in said elevated position. In starting the fire of course the doors are closed so as to retain the heat imparted to the baking compartment.

23 represents the top wall of the baking compartment 7 which extends entirely across the bake oven, the said wall being composed of fire brick or any suitable material.

Located directly above the floor 23 is a flue 24 for the passage of the products of combustion, and located above this flue is a wall 25 similar to the wall 23, above which is a flue 26 similar to the flue 24, covered by a top wall 27.

The flues 8, 24, and 26, are designed to convey the heated products of combustion throughout the oven, the path of said products being varied and controlled by manipulating certain connecting take-up flues which effect a communication between the flues 8, 24, and 26, and which take-up flues are now to be described.

Located at each corner of the bake oven is a take-up flue 28 of the construction as illustrated or its equivalent. Said take-up flues are in communication with the flues 8, 24, and 26, the rear take-up flues however having no direct communication with the flue 26 at that end. The object of said flues 28 is to regulate the temperature of the bake oven, and properly direct the products of combustion through the oven. Said flues 28 are provided with cut-off dampers 29, and these dampers may enter into the flues from the sides of the oven or from the ends as shown.

Located at each end of the bake oven and in the central portions thereof is an exit and take-up flue 30; or in other words there are two exit and take-up flues such as 30, one located at each end of the bake oven. Said flues 30 are provided with dampers 31 and communicate with the flue 26; the one at the front end of the bake oven communicates also directly with the fire box through the medium of the flues 28 at the front and the front end of the flue 26, that is to say, there will be a substantially direct upward communication between the fire box and the front exit flue 30. Said flues 30 extend beyond the top wall 27 of the bake oven to any suitable and convenient distance, as shown in Fig. 1.

Located above the wall 27 is a drying-chamber 32, in which the baked material is placed to be thoroughly dried out after the same is baked. Said chamber 32 is provided with a door 33 for the insertion and removal of the baked or cooked substance. Said drying chamber is warmed by the heat radiated from and transmitted through the top wall 27 of the bake oven.

It may be noted that I can construct my bake oven of any size; but the one now used by me is about five feet in width, exclusive of the width of the flues, and about ten feet in length. The bake oven should be made sufficiently long so as to accommodate the insertion of quite a number of bake pans, in the baking chamber 7 thereof. One of the chain wheels 14 has secured thereto a crank 34, by which the same may be rotated, and consequently revolve or operate the endless chain 15 for the removal and carrying through the baking chamber of the bake pans 10. Each of the bake pans is provided with a lug 35, which is adapted to be inserted in the perforations 16 of the endless chain 15.

By means of the exit flues 30 and the take-up flues 28 the temperature of the bake oven may be controlled in a manner as I will now proceed to describe. When the fire is first started in the bake oven, and in order to heat the same throughout, I close the dampers 31 and 29 of the flues located at the right hand of Fig. 1 or the front of the bake oven. By closing said dampers, the heat and the products of combustion are not led directly out of the bake oven through the front flues, but are caused to pass throughout the flues 8, 24, and 26, that is to say, they pass backwardly through flue 8, then upwardly into the flue 24 through the rear take-up flues 28, then forwardly through the flue 24, then upwardly into the flue 26 through the front take-up flues 28, and then backwardly through the flue 26. After traversing the flues as described, the products of combustion find an outlet through the rear exit flue 30 if its damper be left open, as it always is under these circumstances. Should the bake oven become too warm I reverse this operation closing the dampers of the rear take-up flues and opening the dampers of the front flues, thus permitting the products of combustion to pass directly out of the front flues without passing through the bake oven; or the damper 31 on the right might be closed and damper 31 on the left opened, in which instance the products will pass directly from the fire box through the flue 26 and out from the exit flue 30 on the left.

Referring to the mechanism for elevating or lowering the track-rails which support the bake pans, the levers 18 which effect such elevation or lowering of said rails, are held in their desired adjustment by means of spring pawls 36 which are adapted to engage with the teeth 37 of said levers.

The endless chain 15 is supported on the outside of the oven by means of a roller 38, which is mounted upon a shaft 39, thus preventing said chain from sagging.

40 indicates an operating rod for the removal of the bake pans without operating the endless chain 15 carrying the same. Said operating rod is provided with a series of spring-hooks 41. When the operating rod 40 is inserted under the pans the spring hooks 41 are depressed until they reach the end of the pans, and then they spring upwardly against the end of the pans, and by proper manipulation of said rod the bake pans may be elevated off of the chain and removed.

It may be noted that each of the flues 28 is provided with two dampers, such as 29, one located near the bottom of said flue and the other near the top thereof. These dampers are designed for the proper regulation of the heat throughout the bake oven, it being premised that the dampers 29 and 31 are both used to effect the above stated purpose.

Having described my invention, what I claim is—

1. A bake oven comprising a suitable fire box, a horizontal combustion flue leading therefrom, take-up flues communicating with the rear of said horizontal flue, a second horizontal flue leading from said take-up flues to the front of the oven, an exit and take-up flue leading from said second horizontal flue, a baking compartment passing entirely through the oven and open at both ends interposed between the walls of the horizontal flues and having its corners contiguous to the take-up flues, and suitable means for guiding and suspending the materials to be baked above the floor of the baking compartment, substantially as set forth.

2. A bake oven composed of a suitable fire box, a horizontal flue leading from the same, take-up flues leading from said horizontal flue and fire box respectively, a baking compartment passing entirely through the oven open at both ends and located between said take-up flues and superposed over the horizontal flue, the said take-up flues being contiguous to the corners of the baking compartment, a second flue superposed over the baking compartment and communicating with the take-up flues at either end, a suitable exit flue, and a suitable carrier for guiding and suspending the materials to be baked above the floor of the baking compartment, substantially as set forth.

3. A bake oven comprising a fire box, a horizontal flue leading therefrom, parallel horizontal flues superposed above the first flue, terminal take-up flues at either end of the oven connecting the several flues at one end, and the fire box and flues at the other end, a baking compartment running the full length of the oven, open at both ends and formed by the walls of the horizontal flues and interposed between said walls, and having its corners contiguous to the take-up flues, suitable exit flues communicating with the last horizontal flue of the series at either end thereof, a series of dampers controlling the take-up flues at suitable points in the path of the same, and suitable means for guiding the material to be baked through the oven and suspending it above the floor of the baking chamber, substantially as set forth.

4. A bake oven having a suitable baking chamber, track rails for supporting the series of bake pans located within said chamber, cross pieces secured to the terminal portion of said track rails, chain-wheels mounted on said cross pieces, an endless chain provided with a series of perforations mounted on said chain wheels and adapted to pass through said baking chamber beneath the bake pans, means for securing said pans to said chain, means for rotating said endless chain, and means for elevating said track rails, substantially as set forth.

5. In a bake oven, a baking chamber the openings whereof are provided with suitable doors, L-shaped tracks located in said baking chamber, bake pans provided with suitable lugs and located on said tracks, cross pieces secured to said tracks, chain wheels mounted on said cross pieces, a suitable crank secured to one of said chain wheels for rotating the same, an endless chain provided with suitable perforations for the reception of the lugs of the bake pans, and mounted on said chain wheels, and levers for elevating said tracks simultaneously or independently of each other, substantially as set forth.

6. In a bake oven, a baking chamber the openings whereof are provided with suitable doors, L-shaped tracks located in said baking chamber, bake pans provided with suitable lugs located on said rails, cross pieces secured to said rails, chain-wheels mounted on said cross pieces, a crank secured to one of said chain wheels for rotating the same, an endless chain provided with perforations for the reception of the lugs of the pans mounted on said chain wheels, levers for elevating said rails simultaneously or independently of each other, and spring pawls for holding said levers in their desired adjustment, substantially as set forth.

7. In a bake oven, the combination of carrying-wheels suitably mounted one at each end of the baking chamber and one at each end of one of the outer sides of the chamber, with an endless chain guided on said wheels, whereby one lap of said chain is caused to pass inside the baking chamber and the other lap outside thereof, substantially as set forth.

8. In a bake oven having a suitable baking compartment or chamber, L-shaped track rails within the same for guiding the pans placed in the baking chamber, cross pieces secured to the terminal portions of said rails, chain wheels mounted on said cross pieces, a crank secured to one of said chain wheels for rotating the same, an endless chain provided with a series of perforations, a shaft carrying a roller for supporting the portion of the chain located on the outside of the bake oven, suitable levers having rounded arms or surfaces, and a series of ratchet teeth for elevating or lowering the said rails simultaneously or independently of each other, and suitable spring pawls for holding said levers in adjustment, substantially as set forth.

In testimony whereof I affix my signature in the presence of two witnesses.

JOHN JACOB PFENNINGER.

Witnesses:

JAMES J. O'DONOHOE,
EMIL STAREK.